United States Patent [19]

Sakato et al.

[11] 3,925,289

[45] Dec. 9, 1975

[54] WATER-RESISTANT ADHESIVE COMPOSITIONS

[75] Inventors: Naoyuki Sakato; Hidetosi Nakamura, both of Saitama, Japan

[73] Assignee: Shinetsu Chemical Company, Japan

[22] Filed: Apr. 24, 1974

[21] Appl. No.: 463,774

[30] Foreign Application Priority Data

Apr. 25, 1973 Japan................................. 48-47072

[52] U.S. Cl...... 260/29.6 B; 428/151; 260/29.6 BE; 260/29.6 WA; 260/29.6 N
[51] Int. Cl.²......................................... C08F 45/24
[58] Field of Search... 260/29.6 B, 29.6 BE, 29.6 WA, 260/29.6 N, 29.6 MP, 29.62

[56] References Cited
UNITED STATES PATENTS

| | | |
|---|---|---|
| 2,816,087 | 12/1957 | Coover........................... 260/29.6 B |
| 3,505,264 | 5/1970 | Tholse et al................ 260/29.6 WA |
| 3,563,851 | 12/1971 | Armour et al.............. 260/29.6 WA |
| 3,619,346 | 11/1971 | Sondler.......................... 260/29.6 N |
| 3,644,257 | 2/1972 | Nickerson et al.......... 260/29.6 WA |

Primary Examiner—Joseph L. Schofer
Assistant Examiner—Peter F. Kulkosky
Attorney, Agent, or Firm—McGlew and Tuttle

[57] ABSTRACT

Adhesive compositions comprising a polyvinyl acetate emulsion, a persulfate and N-methylolacrylamide, useful for bonding wood veneers, paper, cloths, leather and the like, exhibiting excellent water resistance. They do not contain formaldehyde, and are harmless to the human body.

10 Claims, No Drawings

WATER-RESISTANT ADHESIVE COMPOSITIONS

FIELD OF THE INVENTION

This invention relates to novel adhesive compositions which can provide a water-resistant bond, suitable especially for the manufacture of plywood.

DESCRIPTION OF THE PRIOR ART

Urea-formaldehyde resins and modified urea-formaldehyde resins, such as urea-melamine-formaldehyde condensate resins, have heretofore been used as adhesives widely in the field of the production of plywood, particle boards and other wood-worked articles. Those adhesives are apt to gradually release free fromaldehyde contained therein in a considerable quantity and also would release the formaldehyde ingredient when the resin is decomposed by any cause whatever. The release of formaldehyde during the bonding operation in a factory of manufacturing plywood and the like would cause the deterioration of the working environment and consequently a serious problem of the health of workers. Further, all building materials, furniture, electric articles, etc. made of the plywood, particle boards or other wood articles, in the prpeparation of which such adhesive is used, tend to release formaldehyde and result to irritate mucous membranes of human eyes and noses. More particularly, tablewares, cupboards and the like made of such plywood are harmful due to the formaldehyde released and then absorbed by foodstuffs stored therein. These are fatal defects involved in the adhesives of urea-formaldehyde resins.

In order to overcome the defects described above, there have been proposed various methods including, for example, a method in which the porportion of melamine to formaldehyde in the modified urea-formaldehyde resin was increased, and a method in which a substance capable of catching formaldehyde was added at the time of bonding. However, insofar as formaldehyde was used as a component in the preparation of the adhesive, it has been impossible to overcome throughly the defects.

Further, polyvinyl acetate and polyvinyl alcohol have been widely employed in making compositions for bonding cellulosic materials, which are free of the harmful formaldehyde but rather poor in water-resistance. Accordingly, several researchers including the inventors of the present invention have attempted to find methods to thereby render polyvinyl acetate or polyvinyl alcohol water-resistant. However, any of them possessing one or other disadvantages have been unable to be successfully applied to the preparation of adhesive compositions useful for bonding cellulosic materials in water-proof conditions.

OBJECTS OF THE INVENTION

It is therefore a primary object of the invention to provide an adhesive which does not contain any hazardous substances such as formaldehyde.

Another object of this invention is to provide an adhesive which can give excellent bonding properties with water resistance.

Still another object of this invention is to provide an adhesive which is used effectively and appropriately for bonding cellulosic materials, such as plywood and paper.

SUMMARY OF THE INVENTION

The foregoing objects of the invention can be attained by an adhesive composition comprising the following three components:

1. an aqueous dispersion of 100 parts by weight of a resin composed of from 10 to 100% by weight of vinyl polymer containing a vinyl acetate unit as its main component and from zero to 90% by weight of polyvinyl alcohol;
2. from 2 to 100 parts by weight of a persulfate; and
3. from 1 to 30 parts by weight of a multifunctional compound having one ethylenically unsaturated hydrocarbon group and at least one group selected from the group consisting of ethylenically unsaturated hydrocarbon groups and N-methylol groups.

The aqueous dispersion of a resin employed in this invention is a polyvinyl acetate emulsion, i.e., emulsion of homopolymers of vinyl acetate or emulsion of copolymers of more than 50 mole % of vinyl acetate with a monomer copolymerizable therewith. The copolymerizable monomers may be exemplified by olefins, such as ethylene, propylene and butylene, halogenated vinyl and vinylidene compounds such as vinyl chloride, vinyl bromide and vinylidene chloride, vinyl esters such as vinyl formate, vinyl propionate, vinyl tertiary capriate, vinyl stearate and vinyl benzoate, isopropenyl esters such as isopropenyl acetate, vinyl ethers such as lauryl vinyl ether and stearyl vinyl ether, esters of unsaturated organic acids such as methyl acrylate, ethyl acrylate, butyl acrylate, 2-ethylhexyl acrylate, methyl methacrylate, ethyl methacrylate, dimethyl maleate, diethyl fumarate and butyl itaconate, unsaturated organic acids such as acrylic acid, methacrylic acid, crotonic acid, maleic acid and itaconic acid, and such monomers as maleic anhydride, acrylamide, acrylonitrile, methacrylamide, methacrylonitrile, vinylidene cyanide, vinylene carbonate, vinylpyrrolidone, methylvinylketone and allyl acetate.

As a component of the resin in the aqueous dispersion is used a polyvinyl alcohol which has a degree of polymerization ranging from 200 to 3000 and a degree of hydrolysis higher than about 75 mole %. There can also be used modified polyvinyl alcohols, which are etherified, esterified or acetalized, and hydrolyzates containing more than 50 mole % of copolymers of vinyl acetate and other copolymerizable monomers, such as ethylene, propylene, vinyl chloride, acrylic acid, methacrylic acid, crotonic acid, acrylic acid esters, methacrylic acid esters, maleic acid, furmaric acid, maleic acid esters, fumaric acid esters, acrylamide and vinylpyrrolidone, as far as they retain solubility in water.

When polyvinyl alcohol is employed in combination with polyvinyl acetate emulsion, their mixing ratio can be variable within a wide range. Since the properties of the adhesive composition vary depending on the mixing ratio, it is desired that the mixing ratio is determined according to the intended use of the adhesive composition. For example, an adhesive for high wet tack at a low solid content is required, the proportion of the polyvinyl alcohol should be increased. On the contrary, an adhesive composition of a high solid content but a low viscosity or a low stringiness is desired, it is preferred that the proportion of the polyvinyl acetate resin should be increased.

As the persulfate, being component (2), any of water soluble persulfates can be used in the invention. Their examples are ammonium peroxodisulfate, sodium peroxodisulfate, potassium peroxodisulfate and potassium peroxomonosulfate.

When the amount of the persulfate incorporated in the composition is smaller than 2 parts by weight per 100 parts by weight of the total resins, water resistance is scarcely exhibited to the resulting bond. On the other hand, when it exceeds 100 parts by weight, there would occur undesired phenomena, such as degradation of the resin component and deterioration of bonded materials. In general, in the case of the adhesive composition having a large proportion of polyvinyl acetate emulsion, a small amount of the persulfate can be enough for attaining satisfactory results. If the adhesive composition of this invention is intended for use in the production of plywood of Class I under CS (U.S. Commercial Standard), the lower limit of the amount of the persulfate to be used will be 5 parts by weight at the polyvinyl alcohol/polyvinyl acetate weight ratio of 20/80, 8 parts by weight at a similar weight ratio of 40/60, 11 parts by weight at a similar ratio of 60/40, or 14 parts by weight at a similar ratio of 80/20. If the water resistance is lower than that required for the plywood of Class I under CS, the lower limit of the amount of the persulfate can be reduced. A persulfate may frequently be used for emulsion polymerization of vinyl acetate as a polymerization initiator, but in this case its amount is generally lower than 1% by weight based on the vinyl actate monomer and most of the persulfate is decomposed during the polymerization reaction. Accordingly, commercially available polyvinyl acetate emulsions cannot be used in this invention without addition of a persulfate.

It is well known in the art that a graft polymer of vinyl acetate onto polyvinyl alcohol is formed during the emulsion polymerization of vinyl acetate in the presence of polyvinyl alcohol. Whereas, when the polyvinyl acetate emulsion prepared in the presence of polyvinyl alcohol is employed as the aqueous dispersion of vinyl polymers, the polyvinyl alcohol remaining ungrafted is only a small portion of the polyvinyl alcohol initially added, the mixing ratio of the polyvinyl acetate and polyvinyl alcohol in this invention is based on the polyvinyl acetate in the emulsion and the total amount of polyvinyl alcohol used before the emulsion polymerization of polyvinyl acetate and added to the resulting emulsion after the polymerization.

The multifunctional compound, being component (3), work to improve the water resistance of the adhesive composition and also reduce the amount of the persulfate to be used. Their examples are N-methylol acrylamide, N-methylol methacrylamide, N,N-dimethylolacrylamide, N,N-dimethylol methacrylamide, N,N'-methylene bisacrylamide, ethylene dimethacrylate, diallyl phthalate, triallyl isocyanurate, triallyl phosphate, triallyl trimellitate and tetraallyl oxyethane.

The adhesive composition of this invention may further comprise, if desired, auxiliary cross-linking agents, such as organic peroxides or hydroperoxides including benzoyl peroxide, lauroyl peroxide, dicumyl peroxide, t-butyl hydroperoxide, cumene hydroperoxide and methylethylketone peroxide, and a precondensate of a phenol-formaldehyde resin, resorcin-formaldehyde resin, melamine-formaldehyde resin or urea-formaldehyde resin. In addition, it is possible to incorporate into the adhesive composition of this invention inorganic fillers, such as clay composed mainly of kaolinite, halloysite, dickite, sericite, pyrophyllite or montmorillonite, talc, calcium carbonate and gypsum; organic fillers, such as wood flour, walnut shell flour, wheat flour, barley flour, corn starch, soy bean flour and dried blood; gelation-preventing agents, such as urea and dicyandiamide; a cellulose derivative such as carboxymethyl cellulose, methyl cellulose, hydroxyethyl cellulose, hydroxypropyl cellulose and mixed ethers thereof; thickening agents, such as polyacrylic acid, polyacrylic acid salt, polyoxyethylene and polyacrylamide; defoaming agents, wetting agents, rust inhibiting agents, fungicides, pH controlling agents and plasticizers.

In general, the composition of this invention is applied in the form of an aqueous dipersion having a solid content of from 5, preferably 10, to 50% by weight, though variable depending on the intended use, the polyvinyl acetate/polyvinyl alcohol mixing ratio and the kind and amount of the additives used. In order to render the adhesive layer water-resistant, it is desired that the adhesive layer is heated to a temperature higher than 80°C, at or after the drying step. The optinum heating temperature and period of time in this case may vary, to be determined depending on the intended degree of water resistance and composition of the adhesive. Generally, the more the persulfate content is in the composition or the higher heating temperature is applied, the greater water resistance will be attained. Further, speaking of the water resistance of the adhesive, when a higher polyvinyl acetate/polyvinyl alcohol ratio gives improvements in water resistance even under milder conditions, e.g., lower heating temperatures and smaller amounts of component (2); addition of a more amount of component (3) can also act to increase the water resistance. On the other hand, an addition of a filler works to reduce the water resistance. The adhesive compositions of this invention wherein no polyvinyl alcohol is contained may have sufficient water resistance even without the heat treatment, applicable for bonding plywood to produce the Class I articles without subjecting them to the hot pressing step.

The adhesive composition of the present invention is applied in wide and various uses. When it is used in the preparation of plywood by bonding veneers, the usual processes of coating by spreader roller, assembling and cold and hot pressing can be adopted without any modifications. In some cases, the cold pressing process may be obviated, and it is made possible to adopt the so-called semi-clamp or non-clamp process wherein the assembling time is shortened, or the hot pressing process is conducted immediately after the assembling. The plywood prepared by use of the adhesive composition of the invention is qualified for passing the standard of Class I under CS.

Other uses of the adhesive composition of the invention include the bond of lumer-core plywood, particle boards, fiber boards, laminated lumber, fancy plywood, such as one overlaid with a sliced veneer or synthetic resin, and various wooden articles, such as furniture, building materials, musical instruments, cabinets, and sporting goods. Moreover, the adhesive composition of this invention is applied for paper articles, such as paper bags, paper boxes, corrugated boards, laminated paper and paper tubes, non-woven fabrics, cloth articles, leather articles and the like.

The adhesive composition of the present invention will now be more fully illustrated by the following examples and data shown in the tables attached thereto. These illustrations should not be considered as limiting in any way the full scope of the present invention as covered in the appended claims.

In the examples, specifically, in the tables, the undermentioned designations will be used for the sake of brevity.

PVA : polyvinyl alcohol
PVAc : polyvinyl acetate
VAc : vinyl acetate
APS : ammonium peroxodisulfate
KPS : potassium peroxodisulfate
PEP : polyoxyethylene alkyl phenol ether
SLS : sodium lauryl sulfate
ASS : alkyl sulfosuccinate
HEC : hydroxyethyl cellulose
DBP : dibutyl phthalate
NMAM : N-methylolacrylamide
NDAM : N,N-dimethylolacrylamide
EDMA : ethylene dimethacrylate
TAOE: tetraallyloxyethane
TAIC : triallylisocyanurate
MNAM : N,N'-methylenebisacrylamide
TAP : triallylphosphate
TATM : triallyltrimellitate
LPO : lauroylperoxide
DAP : diallylphthalate

EXAMPLE 1.

Adhesive compositions were prepared by incorporating into each of the polyvinyl acetate emulsions as indicated in Table I an aqueous solution of polyvinyl alcohol as indicated in Table II, a persulfate and a multifunctional compound or compounds together with a filler or fillers and some other components. Table III shows the formulations in which the total amount of the polyvinyl acetate emulsion and the polyvinyl alcohol solution is taken as 100 parts by weight, while Table IV shows the results of recalculation from Table III, wherein the total resin, i.e., the total amount of the polymeric substances in the emulsion and the polyvinyl alcohol in the solution is taken as 100 parts by weight.

Each of these adhesive compositions was subjected to the adhesion test in accordance with CS. The results are tabulated in Table V, each test values being an average obtained from the test which was repeated 8 times on each composition.

The adhesion test employed herein was carried out on a piece of three-ply plywood, made of the face and back layers of red lauan wood, each 1 mm thick and the core layer of red lauan wood, 2 mm thick, the face and back layers containing 6% by weight of moisture and the core layer containing 9% by weight of moisture. Those layers had been bonded in the following manner: the bonding surfaces were coated with the adhesive composition in an amount of 270 g/m$^2$; the cold pressing was conducted at room temperature under 10 kg/cm$^2$ for 20 minutes; the hot pressing was conducted at 115°C under a pressure of 10 kg/cm$^2$ for 1.5 minutes.

Table I

| Emulsion No. | Kind of polymer | Content of resin other than PVA | Content of PVA | $S_2O_8^{--}$ as APS | Plasticizer | Other components | Solid Content |
|---|---|---|---|---|---|---|---|
| 1 | PVAc | 41.6 | 3.6 | 0.4 | DBP 4.5 | — | 50.7 |
| 2 | PVAc | 43.7 | 5.5 | — | — | — | 49.2 |
| 3 | 70% VAc-30% Veova 911* copolymer | 38.6 | 4.3 | — | DBP 6.1 | PEP 0.6 | 49.6 |
| 4 | 80% VAc-20% ethylene copolymer | 40.5 | — | 0.4 | — | SLS 0.4 HEC 0.4 | 42.0 |
| 5 | 85% VAc-15% 2-ethylhexyl acrylate copolymer | 42.5 | — | — | DBP 5.1 | ASS 0.2 HEC 0.3 | 47.8 |
| 6 | PVAc | 18.5 | 9.2 | 0.1 | — | — | 28.0 |

*Veova 911 : Trade name for the vinyl ester of versatic acid.

Table II

| Solution No. | Kind of Polymer | Degree of Polymerization | Degree of Hydrolysis (mole %) | Solid Content (% by weight) |
|---|---|---|---|---|
| 1 | Fully hydrolyzed PVA | 1720 | 98.5 | 10.0 |
| 2 | Fully hydrolyzed PVA | 550 | 99.3 | 16.0 |
| 3 | Partially hydrolyzed PVA | 2410 | 87.7 | 10.0 |
| 4 | Hydrolyzed 85% VAc-15% acrylamide copolymer | about 1500 | 99.6 | 12.0 |
| 5 | Fully hydrolyzed PVA (powder dispersion) | 1680 | 99.4 | 7.0 |
|   | partially in hydrolyzed PVA (solution) | 2020 | 87.5 | 3.0 |

Table III

FORMULATION OF ADHESIVE COMPOSITIONS

| Sample No. | Emulsion of Table I - Emulsion No. | Parts | Aqueous solution of Table II - Solution No. | Parts | Persulfate | Parts | Additive | Parts | Filler and Other Component | Parts |
|---|---|---|---|---|---|---|---|---|---|---|
| 1 | 4 | 100 | — | — | APS | 2.0 | NMAM | 4.0 | Wood flour | 5.0 |
| 2 | 1 | 50 | 1 | 50 | KPS | 2.5 | NDAM | 3.0 | Wheat flour | 5.0 |
|   |   |   |   |   |   |   |   |   | Urea | 3.0 |
| 3 | 6 | 100 | — | — | APS | 4.0 | NMAA | 4.0 | Bentonite | 7.0 |
| 4 | 1 | 10 | 2 | 90 | APS | 5.0 | NMAM | 5.0 | — | — |
| 5* | 5 | 30 | 1 | 70 | APS | 3.0 | NMAM | 5.0 | Wheat flour | 5.0 |
|   |   |   |   |   |   |   |   |   | Talc | 5.0 |
| 6 | 2 | 25 | 4 | 75 | APS | 4.0 | NMAM | 4.0 | Soy bean flour | 10.0 |
| 7 | 3 | 60 | 3 | 40 | KPS | 2.0 | NMAM | 5.0 | — | — |
| 8 | 6 | 100 | — | — | APS | 4.0 | NMAM | 4.0 | Wood flour | 4.0 |
|   |   |   |   |   |   |   | EDMM | 3.0 | Bentonite | 4.0 |
| 9 | 1 | 50 | 5 | 50 | APS | 2.5 | NMAM | 3.0 | Talc | 20.0 |
| 10 | 4 | 100 | — | — | APS | 2.0 | TAOE | 5.0 | — | — |
| 11** | 1 | 50 | 1 | 50 | APS | 2.5 | EDMA | 6.0 | Wheat flour | 5.0 |
|   |   |   |   |   |   |   |   |   | Gypsum | 7.0 |
|   |   |   |   |   |   |   |   |   | LPO | 4.0 |
| 12 | 3 | 60 | 3 | 40 | KPS | 2.0 | TAIC | 4.0 | Dried blood | 7.0 |
| 13 | 2 | 25 | 4 | 75 | APS | 4.0 | MBAM | 5.0 | Soy bean flour | 7.0 |
|   |   |   |   |   |   |   |   |   | Bentonite | 5.0 |
| 14 | 1 | 10 | 2 | 90 | APS | 5.0 | TAP | 4.0 | — | — |
| 15 | 5 | 30 | 1 | 70 | APS | 3.0 | TATM | 5.0 | Kaolin clay | 5.0 |
|   |   |   |   |   |   |   |   |   | Bentonite | 5.0 |
| 16 | 6 | 100 | — | — | APS | 4.0 | DAP | 5.0 | Wood flour | 10.0 |
| 17 | 1 | 50 | 5 | 50 | APS | 2.5 | MBAM | 5.0 | Talc | 20.0 |
| 18*** | 4 | 100 | — | — | — | — | — | — | — | — |
| 19*** | 6 | 100 | — | — | — | — | NMAM | 4.0 | Bentonite | 7.0 |
| 20*** | 3 | 60 | 3 | 40 | — | — | NMAM | 5.0 | — | — |
| 21*** | 5 | 30 | 1 | 70 | — | — | — | — | Wood flour | 7.0 |
| 22*** | 1 | 50 | 1 | 50 | — | — | EDMA | 6.0 | LPO | 4.0 |

*: pH was adjusted to 6.8 with $Na_2CO_3$.
**: pH was adjusted to 6.7 with $Na_2CO_3$. Parts are parts by weight.
***: Samples for control.

Table IV

COMPOSITIONS OF THE ADHESIVES

| Sample No. | PVAc Resin Parts | PVA Resin Parts | Persulfate | Parts | Additive | Parts | Filler | Parts | Other Component | Parts | Solid Content % |
|---|---|---|---|---|---|---|---|---|---|---|---|
| 1 | 100.0 | — | APS | 5.9 | NMAM | 9.9 | Wood fl. | 12.4 | SLS | 1.0 | 47.8 |
| 2 | 75.4 | 24.6 | KPS | 9.8 | NDAM | 10.9 | Wheat fl. | 18.1 | DBP | 8.2 | 38.3 |
|   |   |   |   |   |   |   |   |   | Urea | 10.9 |   |
| 3 | 66.8 | 33.2 | APS | 14.8 | NMAM | 14.4 | Bent | — | — | — | 37.9 |
| 4 | 22.0 | 78.0 | APS | 26.7 | NMAM | 26.4 | — | — | DBP | 2.4 | 26.8 |
| 5 | 64.5 | 35.5 | APS | 15.2 | NMAM | 25.4 | Wheat fl. | 25.4 | DBP | 7.8 | 33.3 |
|   |   |   |   |   |   |   | Talc | 25.4 | HEC | 0.5 |   |
|   |   |   |   |   |   |   |   |   | ASS | 0.3 |   |
| 6 | 51.2 | 48.8 | APS | 18.8 | NMAM | 18.8 | Soy bean fl. | 47.1 |   |   | 33.3 |
| 7 | 77.9 | 22.1 | KPS | 6.7 | NMAM | 16.8 | — | — | DBP | 12.3 | 38.1 |
|   |   |   |   |   |   |   |   |   | PEP | 1.2 |   |
| 8 | 66.8 | 33.2 | APS | 14.8 | NMAM | 14.4 | Wood fl. | 14.4 | — | — | 40.0 |
|   |   |   |   |   | EDMM | 10.8 | Bent. | 14.4 |   |   |   |
| 9 | 75.4 | 24.6 | APS | 9.8 | NMAM | 10.9 | Talc | 72.5 | DBP | 8.2 | 44.5 |
| 10 | 100.0 | — | APS | 5.9 | TADF | 12.4 | — | — | SLS | 1.0 | 45.8 |
|   |   |   |   |   |   |   |   |   | HEC | 1.0 |   |
| 11 | 75.4 | 24.6 | APS | 9.8 | EDMA | 21.7 | Wheat fl. | 18.1 | DBP | 8.2 | 44.1 |
|   |   |   |   |   |   |   | Gypsym | 25.3 | LPO | 14.4 |   |
| 12 | 77.9 | 22.1 | KPS | 6.7 | TAIC | 13.4 | Dried blood | 23.5 | DBP | 12.3 | 41.4 |
|   |   |   |   |   |   |   |   |   | PEP | 1.2 |   |
| 13 | 51.2 | 48.8 | APS | 18.8 | MBAM | 23.5 | Soy bean fl. | 32.9 | — | — | 35.0 |
|   |   |   |   |   |   |   | Bent. | 23.5 |   |   |   |
| 14 | 22.0 | 78.0 | APS | 26.7 | TAP | 21.1 | — | — | DBP | 2.4 | 26.2 |
| 15 | 64.5 | 35.5 | APS | 15.2 | TATM | 25.4 | Kaol. | 25.4 | DBP | 7.8 | 33.3 |
|   |   |   |   |   |   |   | Bent. | 25.4 | ASS | 0.3 |   |
|   |   |   |   |   |   |   |   |   | HEC | 0.5 |   |
| 16 | 66.8 | 33.2 | APS | 14.8 | DAP | 18.0 | Wood fl. | 36.0 | — | — | 40.0 |
| 17 | 75.4 | 24.6 | APS | 9.8 | MBAM | 17.9 | Talc | 72.5 | DBP | 8.2 | 45.4 |
| 18* | 100.0 | — | APS | 1.0 | — | — | — | — | SLS | 1.0 | 42.0 |
|   |   |   |   |   |   |   |   |   | HEC | 1.0 |   |
| 19* | 66.8 | 33.2 | APS | 0.36 | NMAM | 14.4 | Bent. | 25.3 | — | — | 37.0 |
| 20* | 77.9 | 22.1 | — | — | NMAM | 16.8 | — | — | DBP | 12.3 | 37.0 |
|   |   |   |   |   |   |   |   |   | PEP | 1.2 |   |
| 21* | 64.5 | 35.5 | — | — | — | — | Wood fl. | 35.6 | DBP | 7.8 | 26.4 |
|   |   |   |   |   |   |   |   |   | ASS | 0.3 |   |
|   |   |   |   |   |   |   |   |   | HEC | 0.5 |   |
| 22* | 75.4 | 24.6 | APS | 1.4 | EDMA | 21.8 | — | — | DBP | 8.2 | 36.7 |
|   |   |   |   |   |   |   |   |   | LPO | 14.4 |   |

Parts are all parts by weight per 100 parts by weight of total of the resins.
As abreviations, "fl." is for flour, "Bent." for Bentonite, and "Kaol." for Kaolin clay.
*Samples for control.

Table V

RESULTS OF ADHESION TEST

| Sample No. | Dry adhesion test | | Boil test (Class I) | | Form- aldehyde released p.p.m.*** | Smelling at the manufact- uring process of ply- wood |
|---|---|---|---|---|---|---|
| | Adhesion strength kg/cm² | Wood failure % | Adhesion strength kg/cm² | Wood failure % | | |
| 1 | 22.5 | 100 | 10.0 | 75 | Nil | Nil |
| 2 | 21.9 | 100 | 13.4 | 70 | do. | do. |
| 3 | 20.3 | 100 | 13.8 | 95 | do. | do. |
| 4 | 24.2 | 90 | 12.6 | 75 | do. | do. |
| 5 | 20.1 | 85 | 10.5 | 75 | do. | do. |
| 6 | 22.3 | 85 | 9.8 | 70 | do. | do. |
| 7 | 19.7 | 85 | 11.4 | 65 | do. | do. |
| 8 | 20.1 | 100 | 13.0 | 85 | do. | do. |
| 9 | 22.4 | 100 | 9.5 | 80 | do. | do. |
| 10 | 21.9 | 100 | 14.7 | 90 | do. | do. |
| 11 | 20.5 | 90 | 12.1 | 75 | do. | do. |
| 12 | 19.8 | 100 | 10.1 | 75 | do. | do. |
| 13 | 21.4 | 90 | 9.6 | 70 | do. | do. |
| 14 | 24.1 | 100 | 13.6 | 95 | do. | do. |
| 15 | 20.3 | 85 | 9.9 | 65 | do. | do. |
| 16 | 18.7 | 85 | 11.3 | 70 | do. | do. |
| 17 | 20.2 | 100 | 9.3 | 80 | do. | do. |
| 18* | 16.1 | 75 | 0.2 | 5 | do. | do. |
| 19* | 14.0 | 50 | † | † | do. | do. |
| 20* | 15.9 | 75 | † | † | do. | do. |
| 21* | 14.6 | 35 | † | † | do. | do. |
| 22* | 19.7 | 75 | † | † | do. | do. |
| 23** | 19.8 | 90 | 12.7 | 80 | 7.2 | Abundant |

*Samples for control
**Commercially available urea-formaldehyde resin.
***According to the JAS (Japan Agricultural Standard) method.
† Spontaneously peeled off in the boiling water.
Remark: No cold pressing step was necessitate required, except for Samples 14, 18 and 23.

EXAMPLE 2.

Samples No. 3, No. 4 and No. 14 of Table III were each applied to the surfaces of yellow lauan three-ply plywood, 5 mm thick, in a ratio of 110 g/m². On each piece of the plywood thus coated was placed a sliced sheet of rosewood, and they were bonded in a hot press at 115°C under a pressure of 10 kg/cm² for one minute. The so-called fancy plywood of a natural finish thus produced could pass the boiling test designated for the plywood of Class I in CS.

A similar procedure was carried out on each of Samples Nos. 18 to 22 of Table III, to find that none of the resulting products could pass the above-mentioned boiling test.

EXAMPLE 3.

A drop of each of Samples No. 3, No. 8 and No. 11 of Table III was let fall on a sheet of kraft paper, on which another sheet of kraft paper was placed. The sheets were then pressed together at 160°C for 4 seconds, complete bonding. The resulting test pieces were put into water maintained at 30°C and allowed to stand for 24 hours, to observe no peeling.

An adhesive having a composition similar to Sample No. 3 except that the amount of ammonium peroxodisulfate was 2.0 parts by weight was subjected to the same test, to obtain the same result.

For purposes of comparison, the same was conducted on Samples Nos. 18 to 21 of Table III. It was found that in each test a good bond was obtained, but when allowed to stand in water for 24 hours, the bond became naturally peeled.

What is claimed is:

1. An adhesive composition consisting essentially of
   1. an aqueous dispersion of 100 parts by weight of a resin composed of from 10 to 100% by weight of vinyl polymer containing vinyl acetate unit as its main component and from zero to 90% by weight of polyvinyl alcohol;
   2. from 2 to 100 parts by weight of a persulfate and
   3. from one to 30 parts by weight of a multifunctional compound selected from the group consisting of N-methylol acrylamide, N-methylol methacrylamide, N,N-dimethylol acrylamide, N,N-dimethylol methacrylamide, N,N'-methylene bisacrylamide, ethylene dimethacrylate, diallyl phthalate, triallyl isocyanurate, triallyl phosphate, triallyl trimellitate and tetraallyl oxyethane.

2. The adhesive composition as claimed in claim 1 wherein said vinyl polymer is a homopolymer of vinyl acetate.

3. The adhesive composition as claimed in claim 1 wherein said vinyl polymer is a copolymer of not less than 50 mole % of vinyl acetate and not more than 50 mole % of a monomer or monomers copolymerizable with vinyl acetate.

4. The adhesive composition as claimed in claim 3 wherein said monomer or monomers copolymerizable with vinyl acetate are selected from the group consisting of olefins, acrylic esters, methyacrylic esters, vinyl esters excluding vinyl acetate, vinyl halides, $\alpha,\beta$-unsaturated organic acids, acrylonitrile, acrylamide and maleic anhydride.

5. The adhesive composition as claimed in claim 1 wherein said polyvinyl alcohol is a polymer of fully hydrolyzed polyvinyl alcohol.

6. The adhesive composition as claimed in claim 1 wherein said polyvinyl alcohol is a polymer of partially hydrolized polyvinyl alcohol having a degree of hydrolysis higher than 75 mole %.

7. The adhesive composition as claimed in claim 1 wherein said polyvinyl alcohol is a fully or partially hydrolyzed copolymer having not less than 50 mole % of vinyl acetate and not more thant 50 mole % of a monomer or monomers copolymerizable with vinyl acetate.

8. The adhesive composition as claimed in claim 7 wherein said monomer or monomers copolymerizable with vinyl acetate is selected from the group consisting of olefins, $\alpha,\beta$-unsaturated organic acids, acrylic esters, methacrylic esters and acrylamide.

9. The adhesive composition as claimed in claim 1 wherein said persulfate is selected from the group consisting of ammonium peroxodisulfate, sodium peroxodisulfate and potassium peroxodisulfate 10. The adhesive composition as claimed in claim 1 wherein said persulfate is potassium peroxomonosulfate.

* * * * *